(12) United States Patent
Roskind

(10) Patent No.: US 8,745,525 B1
(45) Date of Patent: Jun. 3, 2014

(54) PRESENTING GRAPHICAL WINDOWS ON A DEVICE

(75) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 13/249,680

(22) Filed: Sep. 30, 2011

Related U.S. Application Data

(63) Continuation of application No. 13/074,704, filed on Mar. 29, 2011, now abandoned.

(51) Int. Cl.
*G06F 3/048* (2013.01)

(52) U.S. Cl.
USPC .......................................................... 715/788

(58) Field of Classification Search
USPC ......... 715/784, 788, 794, 802, 864, 792, 800, 715/804
See application file for complete search history.

(56) References Cited

U.S. PATENT DOCUMENTS

| 2004/0075673 | A1  | 4/2004 | Vale et al. | |
|---|---|---|---|---|
| 2010/0110025 | A1* | 5/2010 | Lim | 345/173 |
| 2011/0239157 | A1* | 9/2011 | Lin et al. | 715/788 |

OTHER PUBLICATIONS

Wang et al., "Roller Interface for Mobile Device Applications," published in Eighth Australasian User Interface Conference (AUIC2007), Ballarat, Australia. Conferences in Research and Practice in Information Technology (CRPIT), vol. 64. (7 pgs.).
U.S. Appl. No. 13/074,704, by James Roskind, filed Mar. 29, 2011.
Office Action from U.S. Appl. No. 13/074,704, dated Nov. 22, 2011, 11 pp.
Response to Office Action dated Nov. 22, 2011, from U.S. Appl. No. 13/074,704, filed Feb. 22, 2012, 11 pp.

* cited by examiner

*Primary Examiner* — Thanh Vu
(74) *Attorney, Agent, or Firm* — Shumaker & Sieffert, P.A.

(57) ABSTRACT

Aspects of this disclosure are directed to presentation of graphical windows on a device. The graphical windows may be generated from one or more applications executing on the device. The device may receive a user gesture to modify a size of a first graphical window. The device may determine one or more attributes of the user gesture. The device may modify the size of the first graphical window based on the determination. The device may then display at least a portion of a second graphical window previously occluded or displaced off-screen by the first graphical window before the size of the first graphical window was modified. The size of the second graphical window may be substantially similar to the modified size of the first graphical window.

19 Claims, 6 Drawing Sheets

PRESENTING GRAPHICAL WINDOWS ON A DEVICE

This application is a continuation of U.S. application Ser. No. 13/074,704, filed Mar. 29, 2011. The entire content of which is incorporated herein by reference.

TECHNICAL FIELD

This disclosure relates to presentation of multiple graphical windows for one or more applications.

BACKGROUND

A device may execute multiple applications simultaneously. For example, a device may be executing e-mail applications, web browsers, and games, as well as any application that generates viewable content. For each application, the device may generate a graphical window for presentation to a user of the device. Each window may be a two-dimensional box, and the visual content generated by each application may be present within the boundary of each respective graphical window. For example, visual content from an e-mail application may be displayed in the graphical window for the e-mail application. Visual content from a web browser application may be displayed in the graphical window for the web browser application, and so forth.

SUMMARY

In one example, this disclosure describes a method including receiving, with a mobile computing device, input, based on a user gesture received using a touch or proximity-sensitive user interface of the mobile computing device, to modify a first graphical window currently being displayed by the touch or proximity-sensitive user interface, determining, with the mobile computing device, one or more attributes of the user gesture to modify the first graphical window, wherein the one or more attributes comprise at least one of a direction and a distance traversed by the user gesture on the touch or proximity-sensitive user interface, modifying, with the mobile computing device, the first graphical window based on the determined one or more attributes, and modifying, with the mobile computing device, a second graphical window, previously occluded or displaced off-screen by the first graphical window before the first graphical window was modified, based on the determined one or more attributes.

In another example, this disclosure describes a computer-readable storage medium comprising instructions that cause one or more processors to perform operations including receiving, with a mobile computing device, input, based on a user gesture received using a touch or proximity-sensitive user interface of the mobile computing device, to modify a first graphical window currently being displayed by the touch or proximity-sensitive user interface, determining, with the mobile computing device, one or more attributes of the user gesture to modify the first graphical window, wherein the one or more attributes comprise at least one of a direction and a distance traversed by the user gesture on the touch or proximity-sensitive user interface, modifying, with the mobile computing device, the first graphical window based on the determined one or more attributes, and modifying, with the mobile computing device, a second graphical window, previously occluded or displaced off-screen by the first graphical window before the first graphical window was modified, based on the determined one or more attributes.

In another example, this disclosure describes a mobile computing device including a touch or proximity-sensitive user interface that receives input based on a user gesture received using a touch or proximity-sensitive user interface of the mobile computing device to modify a first graphical window currently being displayed by the touch or proximity-sensitive user interface, one or more processors that determine one or more attributes of the user gesture to modify the first graphical window, wherein the one or more attributes comprise at least one of a direction and a distance traversed by the user gesture on the touch or proximity-sensitive user interface, and that modify the first graphical window based on the determined one or more attributes, and means for modifying a second graphical window, previously occluded or displaced off-screen by the first graphical window before the first graphical window was modified, based on the determined one or more attributes.

Aspects of this disclosure may provide one or more advantages. In general, aspects of this disclosure may provide easy techniques to select different applications. By modifying a graphical window, aspects of this disclosure may provide the user with an easy technique to view graphical windows for other applications that were previously occluded or displaced off-screen by the graphical window prior to modification of the graphical window. Being able to view the other applications that are currently being executed may make it easier to the user to switch between different applications. Also, because the modification of the graphical window for the other application may be based on the manner in which a graphical window was modified, the user may be able to determine how many windows should be displayed on the screen.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
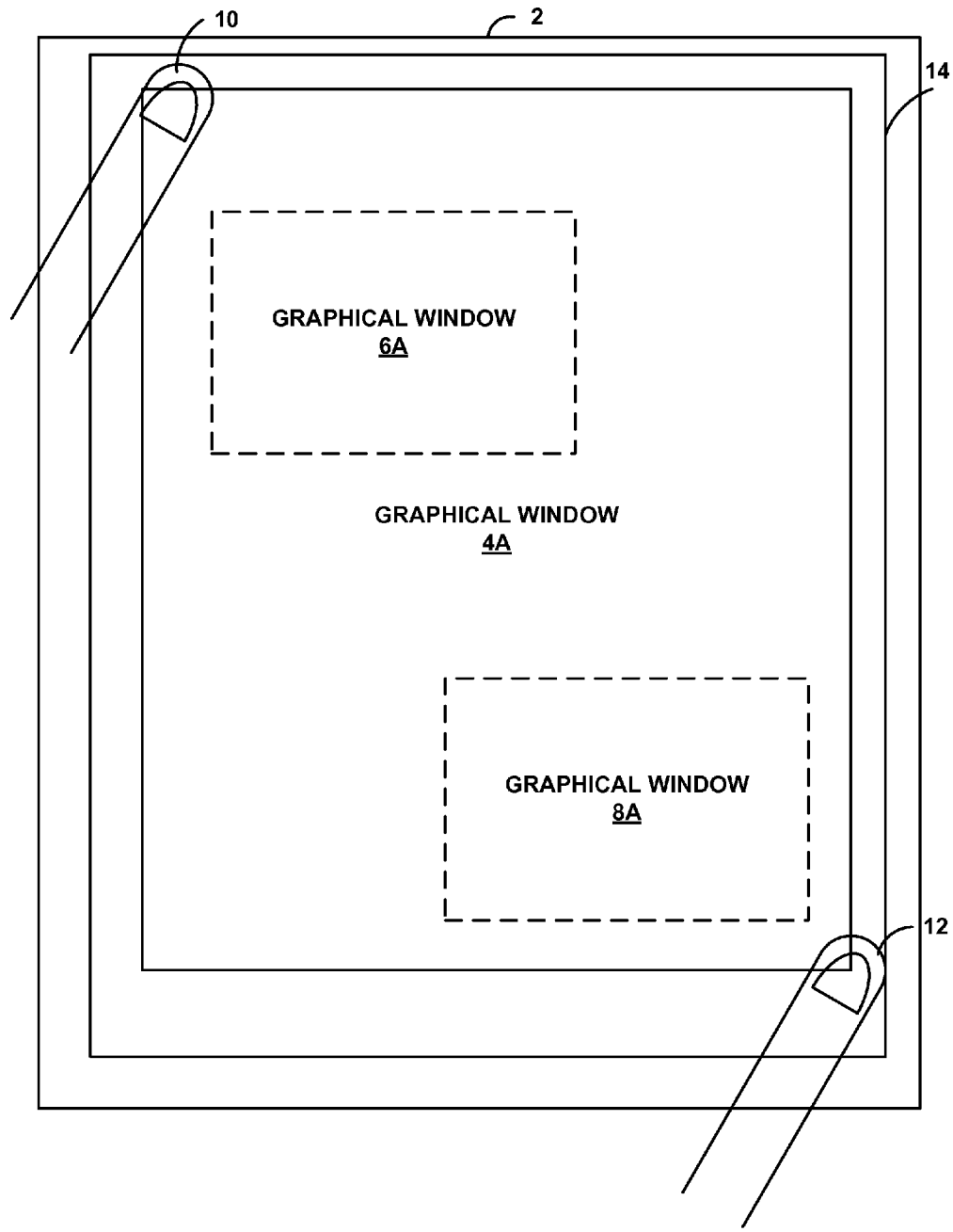
FIGS. 1A, 1B, and 1C are screen illustrations of examples of a display of a device with a user modifying a graphical window.

Certain aspects of this disclosure are related to efficient presentation of applications on a device, such as a mobile device. The mobile device may be executing multiple applications simultaneously. For each application, the mobile device may generate a graphical window for presentation to a user of the mobile device. Due to the limited screen size on mobile devices, it may be difficult for a screen on the mobile device to simultaneously display multiple application windows. However, the user of the mobile device may desire to be able to switch between different applications to view the content for these different applications. For example, a user may be viewing the window for the web browser application when the user receives an e-mail. The user may desire to quickly transition from the web browser window to the e-mail window to view the e-mail.

In some examples, a user may be viewing a graphical window for one application on the device, and the graphical windows for the other applications may not be viewable. The graphical window of the application, currently being viewed, may be of a size that is substantially similar to the size of the screen. To switch from the current application to another application, the user may modify the graphical window of the application, currently being viewed. For example, the user may modify the size of the graphical window, or displace at least a portion of the graphical window off-screen. After modification of the graphical window, the windows for the other applications may become viewable.

For example, after modifying the size of the graphical window, the other graphical windows may become viewable. As another example, after displacing at least a portion of the graphical window off-screen, the other graphical windows may become viewable.

To modify the window of the application, the user may provide a user gesture to. An example of the user gesture to modify the size of the window may include the user placing two fingers on the screen and bringing them together to "shrink" the size of the window of the application. A second example of a the user gesture to modify the size of the window may include the user placing two fingers on each of two possibly distinct edges of the screen and bringing them together to "shrink" the size of the window of the application. The screen may be a touch-sensitive user interface. An example of the user gesture to displace at least a portion of the window off-screen may be the user placing one or more fingers on the screen and moving the one or more fingers horizontally along the screen, e.g., either rightward or leftward along the screen. It should be noted that the above examples to modify the graphical window, e.g., shrink the size or displace the window, are provided for illustration purposes. There may be other techniques with which the user may modify the window to shrink the graphical window or displace at least a portion of the window off-screen.

One or more processors of the device may determine one or more attributes of the user gesture to modify the graphical window. The one or more attributes of the user gesture may indicate how much the window should be modified. As one example, the one or more attributes of the user gesture may be based on the distance traversed by the user's fingers in the user gesture to modify the size of the window or to displace at least a portion of the window. For instance, the one or more attributes of the user gesture may be the distance between the user's fingers before movement and after movement.

Based on the determined one or more attributes, the one or more processors may modify the window of the application that is currently being viewed. For example, if the distance traversed by the user's fingers is relatively large, the one or more processors may substantially shrink the window, or substantially displace the window off-screen. If the distance traversed by the user's fingers is relatively small, the one or more processors may shrink the window by a smaller amount, or not displace the window off-screen by as much as the one or more processors would have if the distance traversed was greater. In some examples, the amount by which a window is modified may be linearly correlated to the one or more attributes of the user gesture to modify the window.

After modification, the user may be able to select another application. For example, the user may select another application by selecting the window that corresponds to application. For instance, the user may touch the portion of the screen that displays the window that corresponds to the application to select the application. Upon selection, the size of the window for the selected application may increase to be substantially similar to the size of the screen on the device.

Figure 1B:
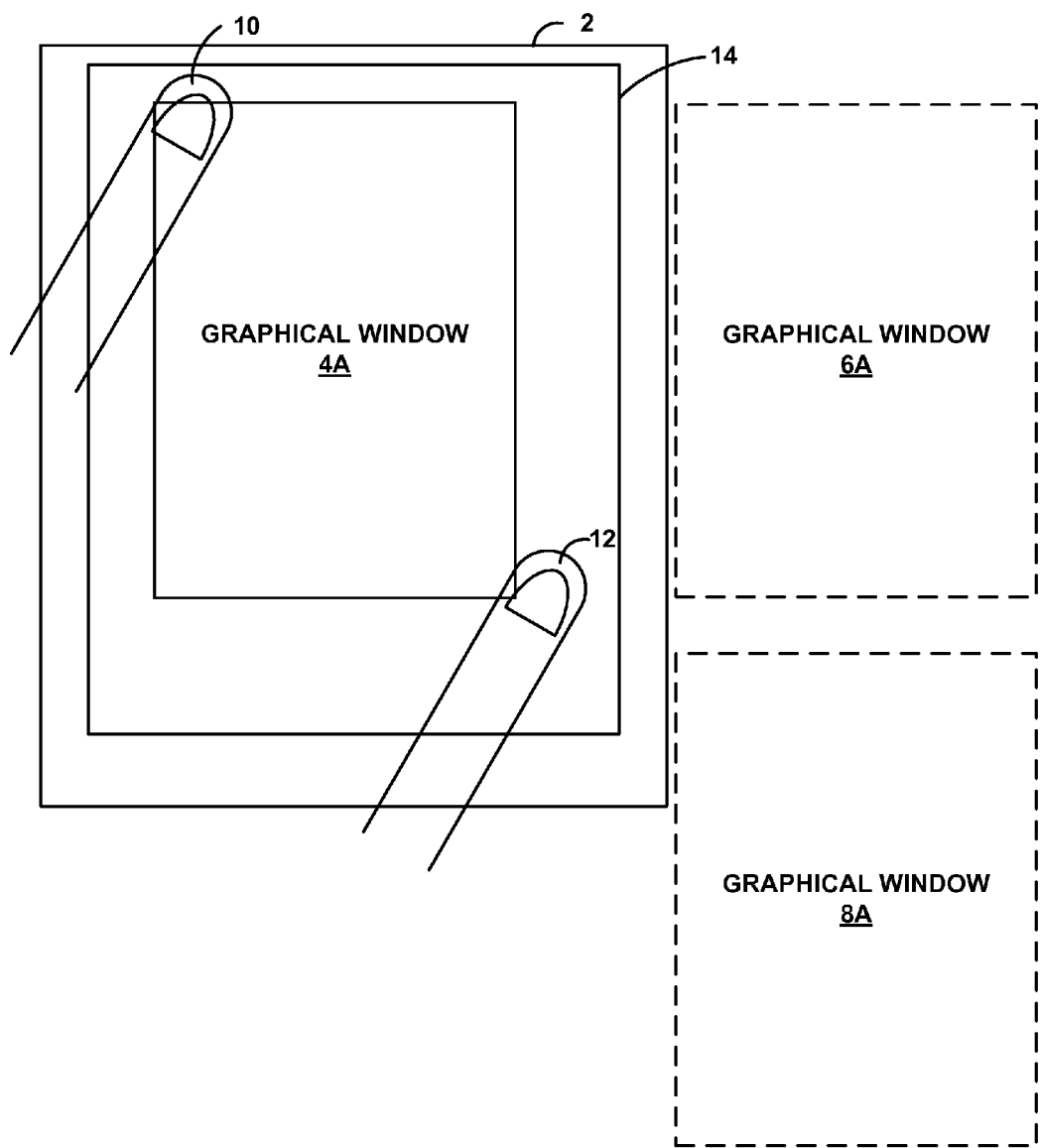
Figure 1C:
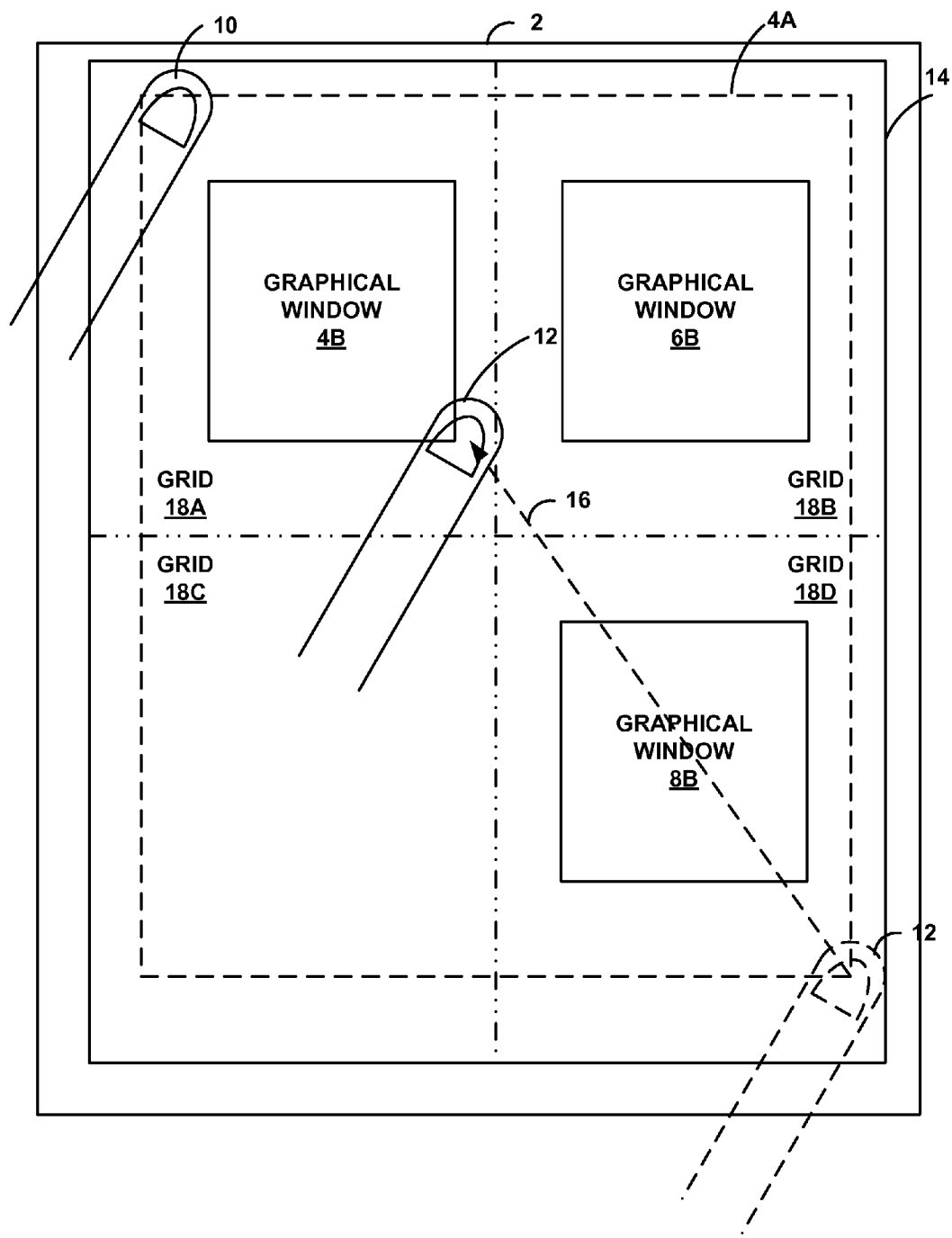

FIGS. 1A, 1B, and 1C are screen illustrations of examples of a display of a device with a user modifying a graphical window. FIGS. 1A, 1B, and 1C illustrate device 2. Examples of device 2 include, but are not limited to, a portable or mobile device such as a cellular phone, a personal digital assistant (PDA), a laptop computer, a portable gaming device, a portable media player, an e-book reader, a tablet computing device, as well as a non-portable device such as a desktop computer.

Device 2 may execute multiple applications simultaneously that each generates viewable content. For example, device 2 may execute e-mail applications, web browsers, and games, as well as other applications that generate viewable content. Device 2 may present the generated viewable content for each application in a graphical window. For example, device 2 may present the viewable content for an e-mail application in one graphical window. In some examples, device 2 may generate multiple graphical windows for a single application. For example, a user of device 2 may use a web browser to view a first website and a second website. In this example, device 2 may generate a graphical window for the first website, and another graphical window for the second website.

The shape of the graphical windows may be rectangles, and the generated visual content may be presented within the boundary of each graphical window. However, the shape of the graphical windows should not be considered limited to rectangles. The shape of the graphical windows may be circles, ovals, or any two-dimensional or three-dimensional shape. The shape of the graphical windows may be based on the type of application being executed by device 2. For purposes of illustration, the graphical windows are described as rectangular graphical windows.

Device 2 may present the graphical windows on display 14. Display 14 may be part of a touch-sensitive user interface (e.g., a touch screen), liquid crystal display (LCD), e-ink, or other displays formed on device 2. However, in some examples, display 14 may be external to device 2, e.g., in desktop computers. For purposes of illustration, aspects of this disclosure are described in the context of display 14 being a touch screen (e.g., a touch-sensitive user interface), formed on device 2, and device 2 being a mobile device.

In examples where display 14 is a part of a touch-sensitive user interface, display 14 may allow the user of device 2 to interact with one or more of the executed applications. For example, the user may scroll through the content of a graphical window via display 14. As another example, display 14 may provide a keypad with which the user may enter text. For instance, display 14 may present a graphical window for a web browser, and the user may use the keypad to enter a website.

When the user of device 2 is interacting with one of the executed applications, the user may desire that the graphical window for that application is displayed prominently. For example, assume that graphical window 4A, of FIGS. 1A and 1B, is a graphical window for an e-mail application, graphical window 6A is a graphical window for a first website, and graphical window 8A is a graphical window for a second website. In this example, device 2 may be simultaneously executing an e-mail application and a web browser application.

Given the limited size of display 14 on device 2, when interacting with the e-mail application, device 2 may size graphical window 4A such that the user can easily read the content within graphical window 4A. As illustrated in FIGS. 1A and 1B, graphical window 4A may be substantially the same size as display 14. However, aspects of this disclosure should not be considered so limiting.

As illustrated in FIG. 1A, graphical window 4A may occlude (e.g., fully occlude, or partially occlude) other graphical windows, e.g., graphical window 6A and graphical window 8A. For purposes of illustration, in FIG. 1A, graphical window 6A and graphical window 8A, in FIG. 1A, are illustrated in dashed lines to indicate that graphical window 4A fully occludes graphical window 6A and graphical window 8A.

As illustrated in FIG. 1B, graphical window 4A may displace graphical window 6A and graphical window 8A such that graphical window 6A and graphical window 8A are off-screen (e.g., fully or partially off-screen). Like FIG. 1A, graphical windows 6A and 8A, in FIG. 1B, are illustrated in dashed lines to indicate that graphical windows 6A and 8A are off-screen. For instance, in the example of FIG. 1B, device 2 may be executing applications that generate graphical windows 6A and 8A. However, due to the size of graphical window 4A, device 2 may not be able to display graphical windows 6A and 8A on display 14. Accordingly, graphical window 4A may be considered as displacing graphical windows 6A and 8A such that graphical windows 6A and 8A are fully or partially off-screen from display 14.

It should be understood that graphical window 4A partially or fully occluding graphical windows 6A and 8A may be different than graphical window 4A partially or fully displacing graphical windows 6A and 8A off-screen. When graphical window 4A partially or fully occludes graphical windows 6A and 8A, the boundaries of graphical windows 6A and 8A may be within the boundary of display 14. In this instance, graphical window 4A may cover graphical windows 6A and 8A such that they are not viewable to a user, as illustrated in FIG. 1A. In other words, in this instance, graphical window 4A may be considered as a front-most window, and graphical windows 6A and 8A being further back windows. It should be understood that such layering of graphical windows 4A, 6A, and 8A is described for purposes of illustration and to ease understanding, and should not be considered as limiting.

When graphical window 4A partially or fully displaces graphical windows 6A and 8A off-screen, the boundaries of graphical windows 6A and 8A may be outside the boundary of display 14, as illustrated in FIG. 1B. In this instance, the size of graphical window 4A may not allow device 2 to display graphical windows 6A and 8A on display 14. In other words, in this instance, graphical windows 4A, 6A, and 8A may each be considered as a front-most window. However, because graphical window 4A is being displayed prominently, graphical window 4A may displace graphical windows 6A and 8A to be off-screen. Again, it should be understood that considering graphical windows 4A, 6A, and 8A to be front-most windows is described for purposes of illustration and to ease understanding, and should not be considered as limiting.

When occluded and/or displaced off-screen, the user may not be able to view graphical windows 6A and 8A. For example, device 2 may be executing the web browser to generate graphical windows 6A and 8A; however, the viewable content within graphical windows 6A and 8A may be not viewable to the user. For instance, in the example of FIG. 1A, graphical windows 6A and 8A may be considered as existing in the background and covered by graphical window 4A such that graphical windows 6A and 8A cannot be viewed by the user of device 2. As another example, in the example of FIG. 1B, graphical windows 6A and 8A may be considered as existing off-screen from display 14 and displaced by graphical window 4A such that graphical windows 6A and 8A cannot be viewed by the user of device 2.

The user of device 2 may desire to switch interaction from one application to another. To switch interaction, the user may desire that the graphical window for the other application is displayed more prominently. In some of the example implementations described in this disclosure, to display the graphical window of another application more prominently, the user may modify the current graphical window. For example, the user may shrink the graphical window. To shrink the current graphical window, the user may apply a user gesture. The user gesture may indicate that the user wants to shrink the prominently displayed graphical window. One non-limiting example of the user gesture is the "pinch-to-shrink" technique.

In the pinch-to-shrink technique, the user may place user digit 10 and user digit 12 in a first position on display 14. For example, as illustrated in FIGS. 1A and 1B, in the first position, digit 10 is at the top left corner of graphical window 4A, and digit 12 is at the bottom right corner of display 14. In this example, device 2 may be configured to recognize that when the user places his or her digits at the top left and bottom right corners of a graphical window, he or she is about to implement the pinch-to-shrink technique. In some examples, device 2 may be configured to recognize that when the user moves his or her digits 10 and 12 from outside to inside the respective top left and bottom right corners of graphical window 4A, he or she is about to implement a pinch-to-shrink-technique. If the user places his or her digits further inside the graphical window, device 2 may be configure to recognize that the user is about to implement a pinch zoom technique, as described in more detail below.

The user may then move digit 12 from the first position to the second position, as illustrated with movement 16 in FIG. 1C. In the second position, digit 12 may be closer to digit 10. The movement of digit 12 or digit 10 may be considered as a user gesture on display 14. Movement 16 may be an attribute of the user gesture. In other words, movement 16 may be an attribute of the pinch-to-shrink user gesture. For example, movement 16 may indicate the direction in which the user moved digit 12, and the amount with which the user moved digit 12 from the first position to the second position.

Movement 16 may cause device 2 to shrink the size of graphical window 4A. For example, as illustrated in FIG. 1C, the size of graphical window 4A may be shrunk to the size of graphical window 4B. After the user shrinks graphical window 4A to the size of graphical window 4B, the other graphical windows may become viewable to the user. For example, as illustrated in FIG. 1C, graphical windows 6B and 8B may become viewable to the user. Graphical windows 6B and 8B, in FIG. 1C, may be re-sized versions of graphical windows 6A and 8A, in FIGS. 1A and 1B. The size of graphical windows 6B and 8B may be based on the size of graphical window 4B, as described in more detail below. For example, in response to modifying the size of graphical window 4A, device 2 may modify the size of graphical windows 6A and 8A to the size of graphical windows 6C and 8C.

For instance, shrinking the size of graphical window 4A may be considered as expanding the amount of visual content that can be displayed on display 14. Accordingly, as illustrated in FIG. 1C, by shrinking graphical window 4A to the size of graphical window 4B, display 14 now possesses sufficient display area to display additional graphical windows, such as graphical windows 6B and 8B. For example, with respect to FIG. 1A, by shrinking graphical window 4A to the size of graphical window 4B, display 14 now possesses sufficient display area to display the content of graphical windows 6A and 8A in graphical windows 6B and 8B, without being occluded by graphical window 4B. As another example, with respect to FIG. 1B, by shrinking graphical window 4A to the size of graphical window 4B, display 14 now possesses sufficient display area to display content of graphical window 6A and 8A in graphical windows 6B and 8B, without displacing off-screen the visual content of graphical windows 6A and 8A.

The size of graphical window 4B may be based on the one or more attributes of the user gesture. For example, the size of graphical window 4B may be based on the amount and direction by which the user moved digit 12 from the first position to the second position, e.g., the distance of movement 16. The size of graphical window 4B may be directly proportional or inversely proportional to the distance of movement 16, or proportional to the distance between digits 10 and 12. For instance, in an alternate example, if the distance of movement 16 were greater than illustrated in FIG. 1C, the modified size of graphical window 4A, e.g., the size of graphical window 4B, may be smaller than illustrated in FIG. 1C. In another alternate example, if the distance of movement 16 were smaller than illustrated in FIG. 1C, the modified size of graphical window 4A, e.g., the size of graphical window 4B, may be bigger than illustrated in FIG. 1B.

As illustrated in FIG. 1C, after the user shrinks graphical window 4A to the size of graphical window 4B, device 2 may display graphical windows 6B and 8B to the user. In some examples, the size of graphical windows 6B and 8B may be substantially similar to the size of graphical window 4B, e.g., the modified size of graphical window 4A. In these examples, the size of graphical windows 6B and 8B may be based on the one or more attributes of the user gesture, e.g., the distance of movement 16. In other words, device 2 may modify the size of graphical windows 6A and 8A to the size of graphical windows 6C and 8C based on the determined attributes with which device 2 shrunk the size of graphical window 4A to the size of graphical window 4B.

For example, FIGS. 1A and 1B illustrate the original size of graphical windows 6A and 8A when they were both occluded or displaced off-screen by graphical window 4A. When the user modifies the size of graphical window 4A to the size of graphical window 4B, device 2 may also re-size graphical windows 6A and 8A. For example, device 2 may re-size the size of graphical windows 6A and 8A to the size of graphical windows 6B and 8B, as illustrated in FIG. 1C. In this example, device 2 may determine the size of graphical windows 6B and 8B based on the size of graphical window 4B. In some examples, the size of graphical windows 6B and 8B may be substantially similar to the size of graphical window 4B.

Device 2 may display graphical windows 4B, 6B, and 8B in a grid format, as one non-limiting example. For example, for purposes of illustration, display 14 may be considered as including grid 18A-18D (collectively referred to as "grids 18"). The size of grids 18 may be based on the size of graphical window 4B, e.g., modified graphical window 4A. In these examples, the one or more attributes of the user gesture to modify graphical window 4A may determine the size of each one of grids 18 because the one or more attributes of the user gesture to modify graphical window 4A determined the size of the modified graphical window 4B.

Each of the graphical windows, e.g., graphical windows 4B, 6B and 8B, may be formed within one of grids 18. For example, as illustrated in FIG. 1C, grid 18A includes graphical window 4B, grid 18B includes graphical window 6B, and grid 18D includes graphical window 8B. The example locations of graphical windows 4B, 6B, and 8B on display 14 are provided for illustration purposes and should not be considered as limiting.

For example, in alternate examples, graphical windows 4B, 6B, and 8B may not need to be sized to be within strict grid lines of grids 18. Rather, graphical windows 6B and 8B may maintain their relative positioning with respect to graphical window 4B. For example, assume that in FIG. 1B, the top-left corner of graphical window 6A is 4 inches to the right from the top-right corner of graphical window 4A. Also, assume that in FIG. 1C, the distance of movement 16 is 2 inches.

In this example, after the user re-sizes graphical window 4A to the size of graphical window 4B, as illustrated in FIG. 1C, the distance between the top-right corner of graphical window 4B and graphical window 6B may be proportionally reduced to keep the relative positioning between graphical windows 4B and 6B the same as the relative positioning between graphical windows 4A and 6A. For example, the distance between the top-right corners of graphical window 4B and graphical window 6B may be 2 inches (e.g., 4 inches between graphical windows 4A and 6A divided 2 inches of movement 16). Also, the top-right corner of graphical window 6B will be 2 inches to the right of graphical window 4B even if graphical window 6B does not fit fully within one of grids 18.

In some examples, the number of graphical windows displayed on display 14 may be a function of the size of each one of grids 18. A small grid size may result in the user being able to see more graphical windows compared to a larger grid size. In these examples, if the user desires to view many graphical windows, the distance of movement 16 in the user gesture may be relatively large. However, if the user desires to view only a few graphical windows, the distance of movement 16 may be relatively small.

After providing the user gesture, e.g., pinch-to-shrink, the user may be able to select another graphical window, which may be associated with a different application. For example, the user may touch the portion of display 14 that displays the graphical window for an application with which the user desires to interact. For example, the user may desire to view the content of the website displayed in graphical window 6B in more detail. In this example, the user may touch the portion of display 14 that displays graphical window 6B. Touching the portion of display 14 that displays graphical window 6B is provided for illustration purposes only and should not be considered limiting. There may be other techniques with which the user may select graphical window 6B or graphical window 8B, and aspects of this disclosure should not be considered limited to the above example. For example, a pinch-to-expand may be applied to another window such as 6B, scaling it up to substantially the same size as display 14.

Furthermore, after modifying graphical window 4A to the size of graphical window 4B, the user may be able to scroll across display 14 to select different applications. For example, device 2 may be executing additional applications, and the graphical windows for these applications may not be viewable after modification of graphical window 4A to graphical window 4B. For example, it may be possible that even after shrinking the size of graphical window 4A, and thereby expanding the amount of content that can be displayed on display 14, there may not be sufficient display area to display all of the off-screen graphical windows. For instance, graphical windows 6A and 8A, previously off-screen, may now be displayed, but other graphical windows (not illustrated) that are also off-screen, may still remain off-screen.

After modification, the user may provide a scrolling gesture to view the other graphical windows that are not currently displayed. The scrolling gesture may be an upward, downward, leftward, rightward, or diagonal gesture. In response to the scrolling gesture, device 2 may display graphical windows for additional applications. The user may then be able to select one of the now displayed graphical windows. In some examples, the size of each of the graphical windows may remain constant as the user moves the graphical windows. For example, the size of graphical windows 4B, 6B, and 8B may remain the same as illustrated in FIG. 1C as the user scrolls to display graphical windows for additional applications.

When a user selects a different graphical window, user device 2 may modify the size of that graphical window such that it is displayed more prominently than the other graphical windows. For example, after modification of graphical window 4A to graphical window 4B, the user may select graphical window 8B. In this example, upon selection of graphical window 8B, device 2 may modify the size of graphical window 8B such that it is the substantially the same size as display 14. After device 2 modifies the size of graphical window 8B, graphical window 8B may occlude graphical windows 4B and 6B such that the user cannot view graphical windows 4B and 6B, or may scale and displace graphical windows 4B and 6B off the edge of display 14 (e.g., graphical windows 4B and 6B may be displaced off-screen after the user selects to display graphical window 8B more prominently).

Aspects of this disclosure may provide one or more advantages. In general, aspects of this disclosure may provide techniques to select different applications. In conventional devices, a user may have to select between different applications with a drop-down menu. However, the drop-down menu may be difficult to manage, and it may not be clear to the user exactly which application he or she is selecting.

As described above, by modifying the size of a graphical window to view the graphical windows for the other application, aspects of this disclosure may provide the user with an easy technique to view the other applications that are currently being executed and select the appropriate graphical window. For example, the viewable content within graphical windows 4B, 6B, and 8B may not be extremely clear or easily readable when the size graphical windows 4B, 6B, and 8B is the size illustrated in FIG. 1C. However, a user may be able to discern what type of viewable content is presented in graphical windows 4B, 6B, and 8B. For example, assume that graphical window 6 displays viewable content from a mapping website. The user may not be able to clearly determine the content within graphical window 6B, e.g., the user may not be able to read the directions within graphical window 6B. However, the user may be able to discern that graphical window 6B is for the mapping website.

Furthermore, in some of the example implementations, the user may be able to determine the size of the graphical windows. In this manner, the user may be able to determine how many graphical windows should be displayed on display 14. For example, assume that device 2 is executing six applications which correspond to six graphical windows. The user may desire to only view a maximum of four graphical windows on display 14. In this example, the user may modify the prominently displayed graphical window, e.g., graphical window 4A, such that display 14 displays up to a maximum of four graphical windows, the other two graphical windows may be displaced off-screen. The user may then scroll leftward, rightward, upward, downward, or diagonally to view the other two graphical windows. However, if the user wishes to view all six graphical windows, the user may modify graphical window 4A such that all six graphical windows are presented on display 14 (e.g., such that none of the graphical windows are displaced off-screen).

In some examples, the manner in which device 2 displays graphical windows 4B, 6B, and 8B within grids 18 may be based on the type of application or applications that generated graphical windows 4B, 6B, and 8B. For example, device 2 may present graphical windows of similar applications in the same row or column of grids 18. As described above, an e-mail application may generate graphical window 4B, and a web browser may generate graphical windows 6B and 8B. In this example, upon modification of graphical window 4A to graphical window 4B, device 2 may present all web browser applications in the same row or column of grids 18. As illustrated in FIG. 1C, graphical windows 6B and 8B are in the same column. In an alternate example, graphical windows 6B and 8B may be in the same row. In this alternate example, graphical window 6B may be within grid 18C.

Arranging graphical windows based on the type of application within grids 18 may make it easier for the user to identify similar applications. However, aspects of this disclosure are not so limited. Arranging graphical windows based on the type of application may not be necessary in every example of this disclosure.

As described above, to modify the size of a graphical window, the user may provide the pinch-to-shrink user gesture, as one non-limiting example. The pinch-to-shrink user gesture should not be confused with a pinch zoom. In the pinch zoom, the user may zoom into or zoom out of the content within a graphical window. However, in the pinch zoom, the size of the graphical window stays constant. In the pinch-to-shrink user gesture, the size of the graphical window changes. The content within the graphical window may change or may remain constant.

Also, as described above, in one example to differentiate between a pinch-to-shrink user gesture and a pinch zoom user gesture, the user may place digits 10 and 12 in different portions of graphical window 4A. However, aspects of this disclosure are not so limited. For example, in some examples, a pinch-to-shrink user gesture may require more digits than a pinch zoom user gesture. For instance, a pinch-to-shrink user gesture may require three digits and a pinch zoom user gesture may require two digits. In this example, device 2 may determine whether device 2 is receiving a pinch-to-shrink user gesture or a pinch zoom user gesture based on the number of digits that the user places on display 14. As another example, after the user places digits 10 and 12 on display 14, device 2 may output a message requesting the user to select either pinch-to-shrink or pinch zoom, and device 2 may determine which user gesture device 2 is receiving based on the selection. There may be different ways in which to differentiate between a pinch-to-shrink user gesture and a pinch zoom user gesture, and aspects of this disclosure should not be considered limited to the examples provided above.

Although the preceding examples of FIGS. 1A, 1B, and 1C describe shrinking the size of graphical window 4A to the size of graphical window 4B to display graphical windows 6B and 8B, aspects of this disclosure are not so limited. In some alternate examples, instead of or in addition to shrinking the size of graphical window 4A, the user may displace at least a portion of graphical window 4A off-screen. Displacing at least a portion of graphical window 4A off-screen may be another example of modifying graphical window 4A.

For instance, the user gesture may be a user gesture to displace at least a portion of graphical window 4A off-screen. Displacing a portion of graphical window 4A may imply that some part of graphical window 4A is not viewable to the user because the user moved that part of graphical window 4A beyond the boundary of display 14. For example, the boundary of display 14 may be area within which device 2 displays graphical windows.

When at least a portion of graphical window 4A is displaced off-screen, the off-screen portion of graphical window 4A may be outside the area within which device 2 displays graphical windows. The remaining portion of graphical window 4A may be within the boundary of display 14, and device 2 may display the remaining portion of graphical window 4A.

After the user displaces at least a portion of graphical window 4A, at least portions of the other windows may become viewable on display 14. For example, after the user displaces at least a portion of graphical window 4A, at least a portion of graphical window 6A and/or 8A may become viewable. After the user displaces at least a portion of graphical window 4A off-screen, display 14 may now have available area to display portions of graphical windows 6A and/or 8A. In this example, device 2 may display portions of graphical windows 6A and/or 8A in the freed up area of display 14 that was previously taken up by graphical window 4A.

There may be various techniques with which the user may displace at least a portion of graphical window 4A off-screen. As one example, the user may place one or more digits, such as digits 10 and/or 12, on display 14. The user may then move the one or more digits horizontally along display 14, e.g., rightward or leftward. In response, device 2 may displace at least a portion of graphical window 4A in the direction of the horizontal movement. As another example, the user may specifically indicate that the user is going to displace at least a portion of graphical window 4A off-screen. In response, device 2 may recognize that any digit movement that is horizontal along display 14 is a user gesture to displace at least a portion of graphical window 4A off-screen. As described above, displacing at least a portion of graphical window 4A off-screen is one example of a user gesture to modify graphical window 4A.

Figure 2:
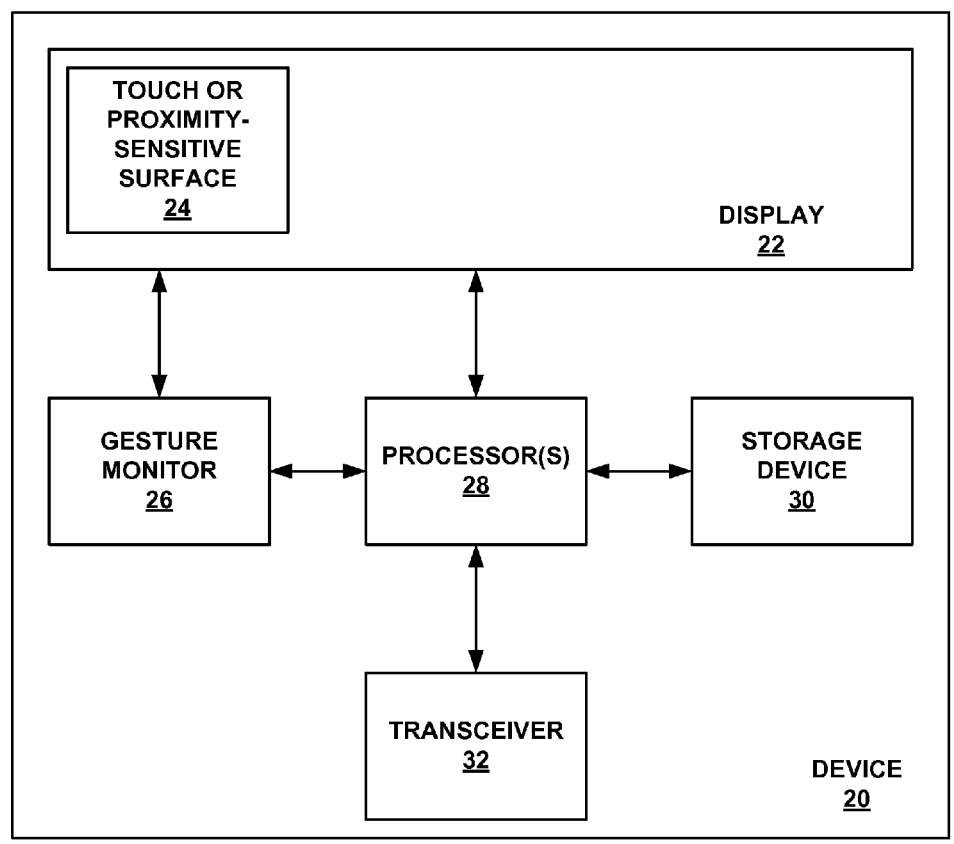
FIG. 2 is a block diagram illustrating an example of a device, in accordance with one or more aspects of this disclosure.

FIG. 2 is a block diagram illustrating an example of a device, in accordance with one or more aspects of this disclosure. FIG. 2 illustrates device 20. Device 20 may be substantially similar to device 2 (FIGS. 1A, 1B, and 1C). Examples of device 20 include, but are not limited to, a portable or mobile device such as a cellular phone, a personal digital assistant (PDA), a laptop computer, a portable gaming device, a portable media player, an e-book reader, a tablet computing device, a watch, as well as a non-portable device such as a desktop computer.

Device 20 may include display 22, gesture monitor 26, one or more processors 28, storage device 30, and transceiver 32. Device 20 may include additional components not shown in FIG. 2 for purposes of clarity. For example, device 20 may also include a microphone and a speaker to effectuate telephonic communication. Device 20 may also include a battery and/or another wired or wireless power supply that provides power to the components of device 20. Device 20 may also include a user interface. The user interface may be a physical user interface such as a keypad, trackball, mouse, or other such user interfaces that allow the user to interact with device 20. In some examples, the user interface may be a graphical user interface (GUI). In these examples, device 20 may not necessarily include a physical user interface; however, it may be possible for device 20 to include both a GUI and one or more physical interfaces. Moreover, the components of device 20 shown in FIG. 2 may not be necessary in every example of device 20.

Although shown as separate components, in some examples, gesture monitor 26, and one or more processors 20 may be formed in a common hardware unit. In some examples, gesture monitor 26 may be a software unit that is executed on one or more processors 20.

Display 22 may be substantially similar to display 14 (FIGS. 1A, 1B, and 1C). Examples of display 22 include, but are not limited to, a touch screen, a proximity-sensitive screen, a liquid crystal display (LCD), an e-ink, or other display. Display 22 presents the visual content of device 20 to the user. For example, display 22 may present at least some or all of the applications executed on device 20 such as an application to display a document, a web browser or a video game, content retrieved from external servers, and other functions that may need to be presented.

As shown in FIG. 2, display 22 may include touch or proximity-sensitive user interface 24. Touch or proximity-sensitive user interface 24 may be the interface that receives the user gesture, e.g., the pinch-to-shrink user gesture, as one example. Although touch or proximity-sensitive user interface 24 is shown as encompassing a portion of display 22, aspects of this disclosure are not so limited. In some examples, touch or proximity-sensitive user interface 24 may encompass the entirety of display 22. In these examples, display 22 and touch or proximity-sensitive user interface 24 may be considered as being the same because all of display 22 is responsive to the user's touches, or when the user's digits are proximate to display 22. In some examples, touch or proximity-sensitive user interface 24 may be outside of display 22.

One or more processors 28 may execute one or more applications to generate graphical windows that present image content, such as graphical windows 4, 6, and 8 (FIGS. 1A, 1B, and 1C). One or more processors 28 may display the graphical windows on display 22. One or more processors 28 may include any one or more of a microprocessor, a controller, a digital signal processor (DSP), an application specific integrated circuit (ASIC), a field-programmable gate array (FPGA), or equivalent discrete or integrated logic circuitry. One or more processors 28 may execute applications stored on storage device 30, in some examples. For ease of description, aspects of this disclosure are described in the context of a single processor 28. However, it should be understood that aspects of this disclosure described with a single processor 28 may be implemented in one or more processors.

The one or more applications that processor 28 executes may be stored in storage device 30, or retrieved from external devices via transceiver 32. Transceiver 32 is configured to transmit data to and receive data from one or more other devices. Transceiver 32 may support wireless or wired communication, and includes appropriate hardware and software to provide wireless or wired communication. For example, transceiver 32 may include an antenna, modulators, demodulators, amplifiers, and other circuitry to effectuate communication between device 20 and one or more other devices.

Storage device 30 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital medium. In some examples, storage device 30 may store one or more instructions that cause one or more processors 28, and gesture monitor 26 to perform various functions ascribed to one or more processors 28, and gesture monitor 26. Storage device 30 may be considered as a computer-readable storage medium comprising instructions that cause one or more processors 28, and gesture monitor 26 to perform various functions.

Storage device 30 may, in some examples, be considered as a non-transitory storage medium. The term "non-transitory" may indicate that the storage medium is not embodied in a carrier wave or a propagated signal. However, the term "non-transitory" should not be interpreted to mean that storage device 30 is non-movable. As one example, storage device 30 may be removed from device 20, and moved to another device. As another example, a storage device, substantially similar to storage device 30, may be inserted into device 20. In certain examples, a "non-transitory" storage medium may store data that can, over time, change (e.g., in RAM), and/or store data that does not change over time. In some examples, a "non-transitory" storage medium may store data that remains stored in the storage medium even after device 20 is turned off, or when power is removed from device 20. In these examples, the data stored in the "non-transitory" storage medium may be retrieved after device 20 is turned back on, or power to device 20 is restored.

The user of device 20 may input a user gesture, such as the pinch-to-shrink user gesture or a gesture to displace at least a portion of a graphical window off-screen, with touch or proximity-sensitive surface 24 to modify a graphical window, e.g., graphical window 4A. In examples where touch or proximity-sensitive surface 24 is a touch-sensitive surface, touch or proximity-sensitive surface 24 may be responsive to user touches. In examples where touch or proximity-sensitive surface 24 is a proximity-sensitive surface, touch or proximity-sensitive surface 24 may be responsive to when a unit, such as the user's digits, are proximate to the touch or proximity-sensitive surface 24.

For example, the user may implement the pinch-to-shrink user gesture by placing digits 10 and 12 (FIGS. 1A, 1B, and 1C) on appropriate portions of graphical window 4A or proximate to appropriate portions of graphical window 4A without necessarily touching display 22, and moving at least one or both of digits 10 and 12 together. In this manner, the user may modify the size of a graphical window generated by processor 28. As another example, the user may place one or more digits, such as digits 10 and 12, on display 22 and move the digits horizontally along display 22 to displace at least a portion of a graphical window off-screen, e.g., such that the portion off-screen is not displayed on display 22.

Gesture monitor 26 may determine one or more attributes of the user gesture that device 20 received to modify the graphical window. The one or more attributes of the user gesture may indicate how much the size of the graphical window should be modified, or how much the graphical window should be displaced off-screen. As one example, the one or more attributes of the user gesture may be based on the distance traversed by digits 10 and 12 (e.g., distance of movement 16 shown in FIG. 1C) in the user gesture to modify the size of the graphical window, or to displace the graphical window off-screen of display 22. For instance, the one or more attributes of the user gesture may be the distance between the digits 10 and 12 before movement 16 and after movement 16.

For example, if the user placed digit 10 on one corner of graphical window 4A, and placed digit 12 on the diagonally opposite corner of graphical window 4A, as illustrated in FIGS. 1A, 1B, and 1C, and then moved at least one or both of digits 10 and 12 together until they touched, gesture monitor 26 may determine that the attribute of the user gesture is that the user traversed virtually the entirety of touch or proximity-sensitive interface 24 of device 20. As another example, if the user place digit 10 on one corner of graphical window 4A, and placed digit 12 on the diagonally opposite corner of graphical window 4A, as illustrated in FIGS. 1A, 1B, and 1C, and then moved at least one or both of digits 10 and 12 together slightly, gesture monitor 26 may determine that the attribute of the user gesture is that the user traversed a slight distance on touch or proximity-sensitive interface 24 of device 20.

As yet another example, the user may place digits 10 and 12 outside of graphical window 4A, but on screen 14, and move digits 10 and 12 together. In this example, gesture monitor 26 may recognize that digits 10 and 12 are outside of graphical window 4A, and this may in turn cause gesture monitor 26 to determine that the user provided a pinch-to-shrink gesture, rather than a pinch-to-zoom gesture. For instance, as one non-limiting example, gesture monitor 26 may be configured to determine that the user is providing a pinch-to-zoom gesture, if the user places digits 10 and 12 within graphical window 4A. However, in this non-limiting example, gesture monitor 26 may be configured to determine that the user is providing a pinch-to-shrink gesture, if the user places digits 10 and 12 outside graphical window 4A and move digits 10 and 12 together.

In a similar manner, gesture monitor 26 may determine that the user is providing a user gesture to displace at least a portion of the graphical window off-screen. For example, gesture monitor 26 may recognize that the user place one or more digits on display 22 and moved the one or more digits horizontally. Gesture monitor 26 may also determine by how much the user moved the digits, e.g., the distance traversed by the movement. As above, in some examples, the user may place the one or more digits within the graphical window, or outside the graphical window and move the digits horizontally.

Gesture monitor 26 may transmit the determined one or more attributes to processor 28. Based on the determined one or more attributes, processor 28 may modify the graphical window, e.g., modify the size graphical window 4A or displace at least a portion of graphical window 4A. For example, if the distance traversed by at least one or both of digits 10 and 12 is relatively large, processor 28 may substantially shrink graphical window 4A, or substantially displace graphical window 4A off-screen. If the distance traversed by at least one or both of digits 10 and 12 is relatively small, processor 28 may shrink graphical window 4A by a smaller amount, or displace graphical window 4A by a smaller amount. In some examples, the amount by which processor 28 modifies graphical window 4A may be linearly correlated to the determined one or more attributes of the user gesture to modify graphical window 4A.

Processor 28 may then modify the graphical window 4A based on the determined one or more attributes. For example, processor 28 may modify the size of graphical window 4A so that the modified size of graphical window 4A is the size of graphical window 4B. As described above, after modification, the other windows (e.g., graphical windows 6 and/or 8) may become viewable (e.g., partially viewable, fully viewable). As another example, processor 28 may displace at a portion of graphical window 4A off-screen. As described above, after displacing a portion of graphical window 4A off-screen, at least a portion of other windows (e.g., at least a portion of graphical windows 6 and/or 8) may become viewable.

For instance, in response to processor 28 modifying the size of graphical window 4A, processor 28 may modify a size of graphical windows 6A and 8A, to the size of graphical windows 6B and 8B. The size of graphical windows 6B and 8B may be based on the attributes with which processor 28 modified the size of graphical window 4A to the size of graphical window 4B. In some examples, the size of graphical windows 6B and 8B may be the same size as graphical window 4B. Also, as described above, graphical windows 6A and 8A may have been previously occluded or displaced off-screen by graphical window 4A before the size of graphical window 4A was modified to the size of graphical window 4B.

In some examples, the size of the now at least partially viewable graphical windows may be based on the size of the modified graphical window. For example, processor 28 may size the now viewable graphical windows to be substantially similar to the size of the modified graphical window. In this manner, the user may be able to select how large or small the now viewable graphical windows should be. For instance, if the user desires that the content of the now viewable graphical windows should be easy to read, the user may not shrink the size of the graphical window by too much. If, however, the user prefers that more graphical windows be presented and does not require the content of the now viewable graphical windows to be easy to read, the user may shrink the size of the graphical window by a relatively large amount.

Similarly, in response to processor 28 displacing at least a portion of graphical window 4A off-screen, processor 28 may cause display 22 to display at least a portion of graphical windows 6A and/or 8A. The size of these now displayed graphical windows may be the same size of graphical window 4A; however, aspects of this disclosure are not so limited. Because processor 28 may now cause display 22 to display at least a portion of graphical windows 6A and/or 8A, processor 28 may be considered as modifying a graphical window that was previously occluded or displaced off-screen by graphical window 4A before graphical window 4A was modified. In some examples, processor 28 may modify the graphical window which was previously occluded or displaced off-screen by graphical window 4A before graphical window 4A was modified based on the attributed of the user gesture.

For example, if the user gesture traversed a relatively large distance of display 22, then processor 28 may displace a larger portion of graphical window 4A. This may free up a larger area on display 22 for displaying graphical windows 6A and/or 8A. In response, processor 28 may display the portions of graphical windows 6A and/or 8A to encompass the freed up area by the displacement of graphical window 4A. If, however, the user gesture traversed a relatively small distance of display 22, then processor 28 may displace a smaller portion of graphical window 4A. This may free up a smaller area on display 22 for displaying graphical windows 6A and/or 8A. For instance, the amount of area to display portions of graphical windows 6A and/or 8A may be less, in this example, as compared to the example where the user gesture traversed a relatively large distance of display 22.

In some examples, provided for illustration purposes only, processor 28 may cause display 22 to display graphical windows 4B, 6B, and 8B in a grid format, e.g., within grids 18 shown in FIG. 1C. It should be noted that grids 18 may not be viewable to the user. Grids 18 may be a construct of processor 28 to determine where and how to display graphical windows 4B, 6B, and 8B. For example, processor 28 may display each one of the graphical windows within each one of grids 18.

Processor 28 may determine the size of each one of grids 18 based on the size of the modified graphical window. Processor 28 may also determine the number of grids 18 based on the size of each one of grids 18. For example, the more the user shrinks a graphical window, the more grids 18 that processor 28 generates within display 22. Also, in this example, since each one of grids 18 includes one graphical window, the more grids 18 that processor 22 generates may result in display 22 displaying more graphical windows.

After the modification of a graphical window, gesture monitor 26 may determine whether the user selected another graphical window. For example, the user may touch touch-sensitive surface 24 at a location where display 22 displays another graphical window. Gesture monitor 26 may determine which one of the graphical windows the user selected based on his or her touch. Gesture monitor 26 may transmit an indication to processor 28 regarding which one of the graphical windows the user selected. In response, processor 28 may modify the size of the selected graphical window such that the size of the graphical window is substantially similar to the size of display 22.

In some examples, after processor 28 modifies a graphical window, e.g., after processor 28 modifies the size of graphical window 4A to graphical window 4B, processor 28 may modify the viewable content within graphical window 4B. For instance, in some examples, processor 28 may shrink the content presented within graphical window 4A such that it fits within graphical window 4B. Similarly, processor 28 may shrink the content within graphical windows 6A and 8A such that they fit within graphical windows 6B and 8B.

In alternate examples, processor 28 may not shrink the content within graphical windows 4A, 6A, and 8A to fit within graphical windows 4B, 6B, and 8B. In these examples, processor 28 may maintain a size of the viewable content within the modified graphical window. For example, the size of the viewable content within the modified graphical window may be substantially similar to the size of the viewable content within the graphical window before the size of the graphical window was modified.

In examples where processor 28 modifies the viewable content, the viewable content may not be easy to read. However, the user may still be able to determine the type of content within each graphical window. For instance, the user may not be able to easily discern the viewable content within graphical window 4B, but may still be able to determine that graphical window 4B is presenting e-mail content.

In examples where processor 28 maintains a size the viewable content, e.g., does not modify the size of the viewable content, all of the viewable content may not be presented in the modified graphical windows. For example, the user may not be able to read all of the content within graphical window 6B, assuming that processor 28 did not modify the size of the viewable content within graphical window 6B. As with the previous example, even in this instance, the user may still be able to discern the type of content within graphical window 6B.

As described above, gesture monitor 26 may determine the attributes of the user gesture. In some examples, there may be a limit to how much processor 28 will modify the size of a graphical window. For example, after a user gesture boundary, e.g., a shrink boundary, processor 28 may not shrink the size of a graphical window any further. Processor 28 may determine whether the one or more attributes of the user gesture reached the user gesture boundary. When the user gesture reaches the user gesture boundary, processor 28 may modify the size of that graphical window to a size of a graphical thumbnail. The graphical thumbnail may only include an indication of the type of content within the graphical window, but may not present the actual viewable content.

In some examples, gesture monitor 26 may also recognize when a user scrolls across display 22 to view additional graphical windows. For example gesture monitor 26 may determine whether the user provided an upward, downward, leftward, rightward, or diagonal scroll gesture. Gesture monitor 26 may transmit an indication of the scroll gesture to processor 28. Processor 28 may then cause display 22 to display the additional graphical windows.

Figure 3:
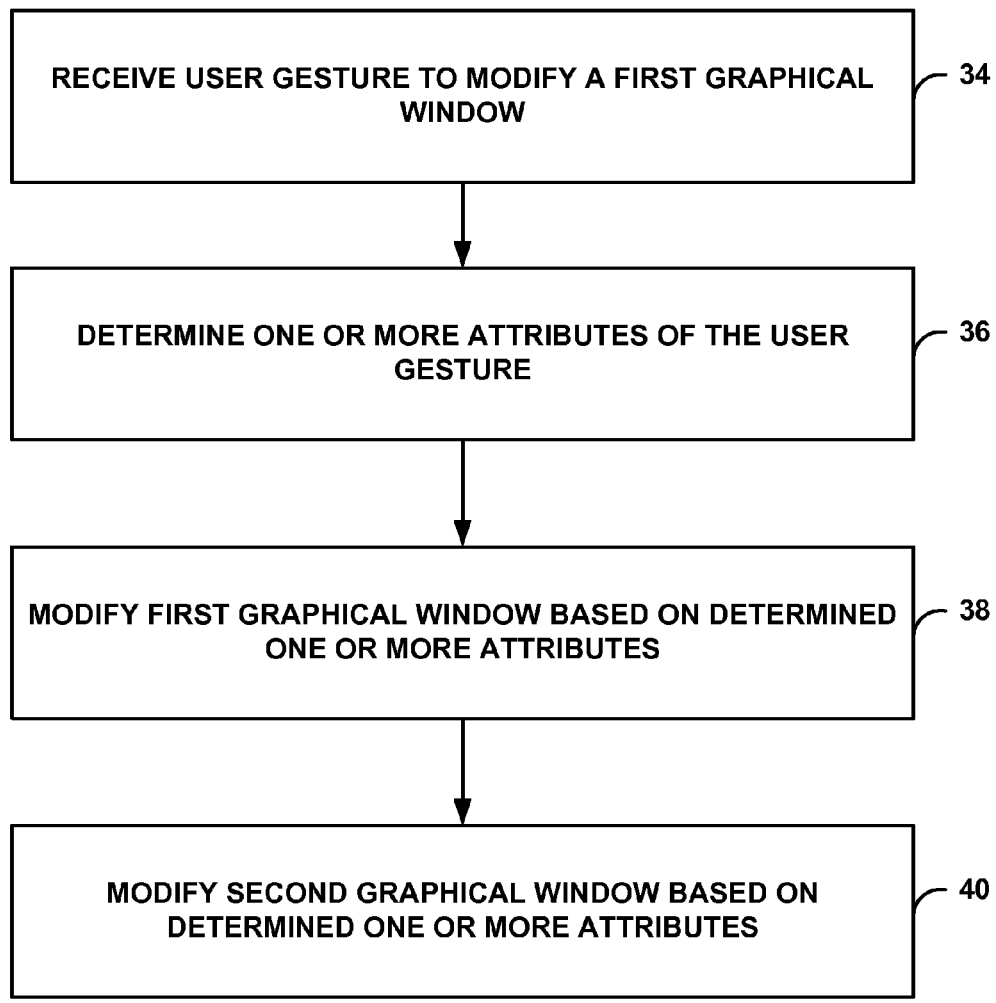
FIG. 3 is a flowchart illustration of an example operation of a device, in accordance with one or more aspects of this disclosure.

FIG. 3 is a flowchart illustration of an example operation of a device, in accordance with one or more aspects of this disclosure. For purposes of illustration only, reference is made to FIGS. 1A, 1B, 1C, and 2. It may be possible for devices and/or components other than the devices and/or components illustrated in FIGS. 1A, 1B, 1C, and 2 to implement the example operation illustrated in FIG. 3. The example of FIG. 3 should not be considered limited to be performed by the devices and/or components of FIGS. 1A, 1B, 1C, and 2.

A user gesture to modify a first graphical window may be received (34). The user gesture may be received via touch or proximity-sensitive surface 24 of display 22. As one example, the user gesture may be a pinch-to-shrink user gesture. The pinch-to-shrink user gesture may reduce the size of the first graphical window. In the pinch-to-shrink user gesture, the user may place digits 10 and 12 on ends of the first graphical window and move at least one or both of digits 10 and 12 together to modify, e.g., shrink, the size of the first graphical window. As another example, the user gesture may be a user gesture to displace at least a portion of the first graphical window off-screen of display 22. The user gesture may be received by the user placing one or more digits on display 22 and moving the digits horizontally, as one non-limiting examples. There may be other examples of user gestures to shrink or displace the first graphical window, and aspects of this disclosure are not limited to the above examples.

One or more attributes of the user gesture may be determined (36). The attributes may be characteristics of the user gesture such as the distance of movement 16. The size of the first graphical window may be modified based on the determined one or more attributes, or the amount by which the first graphical window is displaced may be based on the determined one or more attributes (38). For example, size of graphical window 4B may be based on the distance of movement 16. The size of graphical window 4B may be linearly correlated to the distance of movement 16. For example, the size of graphical window 4B may be proportional or inversely proportional to the distance of movement 16.

A second graphical window may be modified in response to the modification of the first graphical window based on the determined one or more attributes (40). The second graphical window may have been occluded by the first graphical window before the first graphical window was modified, or may have been effectively beyond the border of the screen (e.g., displaced off-screen). Accordingly, the displaying of the second graphical window may be considered as modifying the second graphical window based on the determined one or more attributes because the second graphical window was previously not viewable, e.g., occluded or was beyond the border of the screen. In some examples, the size of the second graphical window may be substantially similar to the modified size of the first graphical window. In some examples, in addition to the second graphical window, a plurality of additional graphical windows may be displayed.

The modified first graphical window, the second graphical window, and each of the plurality of additional graphical windows may be displayed in each one of grids 18. The size of each one of grids 18 may be based on the modified size of the first graphical window. The size of each one of the plurality of additional graphical windows may be substantially similar to the modified size of the first graphical window.

In some examples, the plurality of additional graphical windows may be displayed in each one of grids 18 based on the type of application or applications that generated the additional graphical windows. For example, similar graphical windows, e.g., two different website windows, or graphical windows generated from similar application, e.g., two different games, may be displayed in common rows or columns of grids 18. In this manner, the user may be able to better identify similar applications and may be able to more easily determine which graphical window to select.

Figure 4:
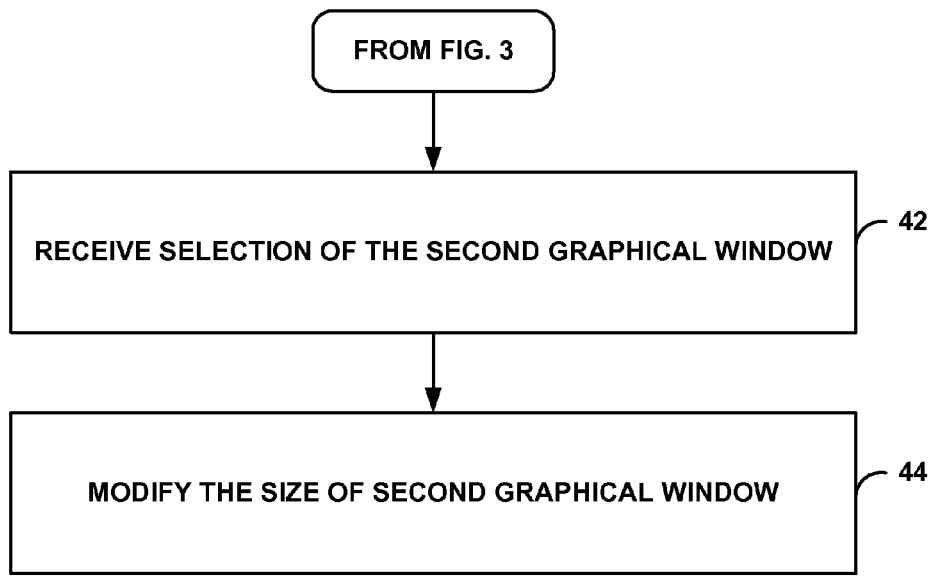
FIG. 4 is a flowchart illustration of another example operation of a device, in accordance with one or more aspects of this disclosure.

FIG. 4 is a flowchart illustration of another example operation of a device, in accordance with one or more aspects of this disclosure. For purposes of illustration only, reference is made to FIGS. 1A, 1B, 1C, 2, and 3. It may be possible for devices and/or components other than the devices and/or components illustrated in FIGS. 1A, 1B, 1C, and 2 to implement the example operation illustrated in FIG. 4. The example of FIG. 4 should not be considered limited to be performed by the devices and/or components of FIGS. 1A, 1B, 1C, and 2.

In the example illustrated in FIG. 4, after a second graphical window is displayed, as described in FIG. 3, a selection of the second graphical window may be received (42). For example, the user may select the second graphical window, with the touch or proximity-sensitive user interface 24, based on the location where the second graphical window is displayed on display 22. After selection, the size of the second graphical window may be modified (44). For example, the size of the second graphical window may be modified such that the modified size of the second graphical window is substantially similar to the size of display 24.

Figure 5:
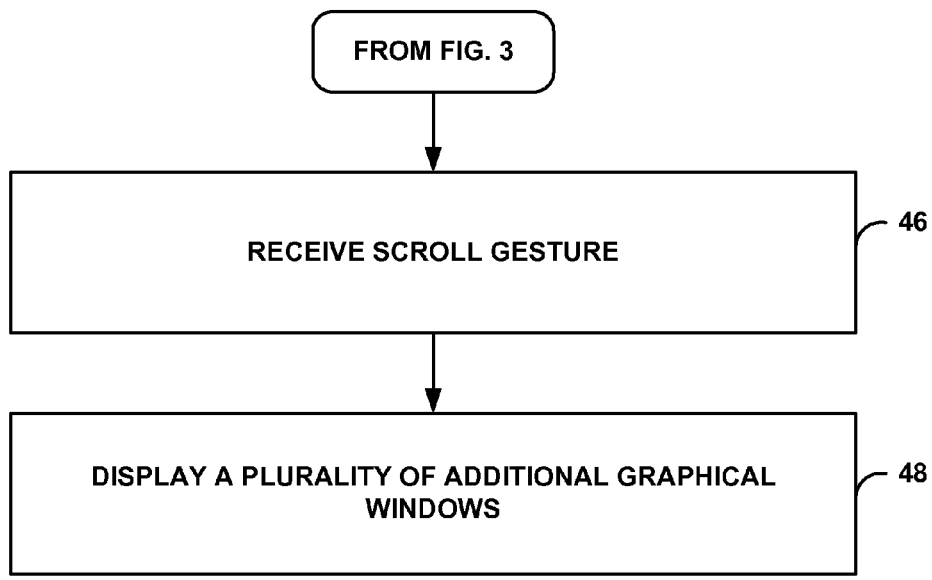
FIG. 5 is a flowchart illustration of another example operation of a device, in accordance with one or more aspects of this disclosure.

FIG. 5 is a flowchart illustration of another example operation of a device, in accordance with one or more aspects of this disclosure. For purposes of illustration only, reference is made to FIGS. 1A, 1B, 1C, 2, and 3. It may be possible for devices and/or components other than the devices and/or components illustrated in FIGS. 1A, 1B, 1C, and 2 to implement the example operation illustrated in FIG. 5. The example of FIG. 5 should not be considered limited to be performed by the devices and/or components of FIGS. 1A, 1B, 1C, and 2.

In the example illustrated in FIG. 5, after a second graphical window is displayed, as described in FIG. 3, a scroll gesture may be received (46). For example, the user may provide the scroll gesture with touch-sensitive user interface 24 to scroll the content on display 22 upwards, downwards, rightwards, leftwards, or diagonally. Responsive to the scroll gesture, a plurality of additional graphical windows may be displayed (48). For example, display 22 may display additional graphical windows after the user provides the scroll gesture with touch or proximity-sensitive user interface 24. The size of the plurality of additional graphical windows may be substantially similar to the modified size of the first graphical window.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may comprise a computer data storage medium such as RAM, ROM, NVRAM, EEPROM, flash memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
receiving, by a mobile computing device and based on a user gesture received at a touch or proximity-sensitive user interface of the mobile computing device, input to modify a size of a first graphical window currently being displayed at the touch or proximity-sensitive user interface;
determining, by the mobile computing device, one or more attributes of the user gesture to modify the size of the first graphical window, wherein the one or more attributes comprise at least one of a direction and a distance traversed by the user gesture at the touch or proximity-sensitive user interface;
modifying, by the mobile computing device, the size of the first graphical window based on the determined one or more attributes, wherein the modified size of the first graphical window is less than a size of the touch or proximity-sensitive user interface; and
in response to modifying the size of the first graphical window, automatically modifying, by the mobile computing device, a size of a second graphical window to be substantially similar to the modified size of the first graphical window, the second graphical window having been previously occluded or displaced off-screen by the first graphical window before the first graphical window was modified.

2. The method of claim 1, further comprising:
displaying at least a portion of the second graphical window, which was previously occluded or displaced off-screen by the first graphical window before the first graphical window was modified.

3. The method of claim 1, further comprising:
displaying at least a portion of each of the modified first graphical window, and the modified second graphical window in one or more plurality of grids.

4. The method of claim 3, further comprising:
determining a size of the each of the plurality of grids based on the modified first graphical window.

5. The method of claim 1, further comprising:
executing a first application, by the mobile computing device, to generate viewable content within the first graphical window; and
executing a second application, by the mobile computing device, to generate viewable content within the second graphical window.

6. The method of claim 1, further comprising:
executing an application, by the mobile computing device, to generate viewable content within the first graphical window and the second graphical window.

7. The method of claim 1, further comprising:
modifying a size of viewable content within the modified first graphical window.

8. The method of claim 7, wherein modifying the size of the viewable content within the modified first graphical window comprises modifying the size of the viewable content within the modified first graphical window based on the modified size of the first graphical window.

9. The method of claim 1, further comprising:
maintaining a size of viewable content within the modified first graphical window.

10. The method of claim 9, wherein maintaining the size of the viewable content within the modified first graphical window comprises maintaining a size of viewable content within the first graphical window before the first graphical window was modified.

11. The method of claim 1, further comprising:
determining whether the one or more attributes of the user gesture reached a user gesture boundary.

12. The method of claim 11, further comprising:
modifying the size of the first graphical window to a size of a graphical thumbnail based on the determination of whether the one or more attributes of the user gesture reached the user gesture boundary, wherein the graphical thumbnail includes an indication of a type of viewable content within the first graphical window.

13. The method of claim 1, further comprising:
receiving additional input, based on a scroll gesture received using the touch or proximity-sensitive user interface, to scroll content displayed on a display presented on the touch or proximity-sensitive user interface; and
responsive to scrolling the content, displaying a plurality of additional graphical windows.

14. The method of claim 1, wherein the user gesture comprises a pinch-to-shrink user gesture comprising placing at least two user digits on the touch or proximity-sensitive user interface and moving the at least two user digits together.

15. The method of claim 14, wherein the one or more attributes comprises a distance traversed by the at least one of the at least two user digits in the user gesture.

16. The method of claim 1, wherein the user gesture comprises placing one or more digits on the touch or proximity-sensitive user interface and moving the one or more digits horizontally along the touch or proximity-sensitive user interface.

17. The method of claim 1, wherein in response to modifying the size of the first graphical window, automatically modifying the size of second graphical window comprises in response to modifying the size of the first graphical window, automatically and without receiving another user gesture, modifying, by the mobile computing device, the size of the second graphical window to be substantially similar to the modified size of the first graphical window, the second graphical window having been previously occluded or displaced off-screen by the first graphical window before the first graphical window was modified.

18. A computer-readable storage medium comprising instructions that cause one or more processors to perform operations comprising:

receiving, by a mobile computing device and based on a user gesture received at a touch or proximity-sensitive user interface of the mobile computing device, input to modify a size of a first graphical window currently being displayed at the touch or proximity-sensitive user interface;

determining, by the mobile computing device, one or more attributes of the user gesture to modify the size of the first graphical window, wherein the one or more attributes comprise at least one of a direction and a distance traversed by the user gesture at the touch or proximity-sensitive user interface;

modifying, by the mobile computing device, the size of the first graphical window based on the determined one or more attributes, wherein the modified size of the first graphical window is less than a size of the touch or proximity-sensitive user interface; and in response to modifying the size of the first graphical window, automatically modifying, by the mobile computing device, a size of a second graphical window to be substantially similar to the modified size of the first graphical window, the second graphical window having been previously occluded or displaced off-screen by the first graphical window before the first graphical window was modified.

19. A mobile computing device comprising:

a touch or proximity-sensitive user interface that receives input based on a user gesture to modify a size of a first graphical window currently being displayed at the touch or proximity-sensitive user interface; and one or more processors that:

determine one or more attributes of the user gesture to modify the size of the first graphical window, wherein the one or more attributes comprise at least one of a direction and a distance traversed by the user gesture at the touch or proximity-sensitive user interface;

modify the size of the first graphical window based on the determined one or more attributes, wherein the modified size of the first graphical window is less than a size of the touch or proximity-sensitive user interface;

in response to modifying the size of the first graphical window, automatically modify a size of a second graphical window to be substantially similar to the modified size of the first graphical window, the second graphical window having been previously occluded or displaced off-screen by the first graphical widow before the first graphical window was modified.

* * * * *